United States Patent [19]
Larsson

[11] Patent Number: 5,712,541
[45] Date of Patent: Jan. 27, 1998

[54] METHOD AND APPARATUS FOR ACTUATING SYNCHRONOUS MOTORS

[75] Inventor: Krister Larsson, Huddinge, Sweden

[73] Assignee: Landis & Gyr Technology Innovation AG, Sweden

[21] Appl. No.: 614,509

[22] Filed: Mar. 13, 1996

[30] Foreign Application Priority Data

Apr. 19, 1995 [SE] Sweden .................................. 1118/95

[51] Int. Cl.$^6$ ...................................................... H02P 05/46
[52] U.S. Cl. ........................... 318/65; 318/41; 318/49; 318/112; 318/280
[58] Field of Search .............................. 318/65, 721, 257, 318/723, 722, 41, 49, 50, 105, 112, 59, 280

[56] References Cited

U.S. PATENT DOCUMENTS

| | | | |
|---|---|---|---|
| 3,628,116 | 12/1971 | Preikschat | 318/257 |
| 4,024,443 | 5/1977 | Schmucket et al. | 318/721 |
| 4,271,385 | 6/1981 | Azusawa | 318/722 |
| 4,288,732 | 9/1981 | Wilson et al. | 318/723 |

*Primary Examiner*—John W. Cabeca
*Attorney, Agent, or Firm*—Greer, Burns & Crain, Ltd

[57] ABSTRACT

The invention concerns a method and an apparatus for actuating a plurality of synchronous motors which are connected to a common power supply and which are respectively used for displacing an element between two limit positions and have a connection Y1 for forward motion, a connection Y2 for reverse motion and a neutral connection G. In that case the respective connection between the connection Y1 or Y2 which is in use and the power supply is interrupted by means of a limit switch which responds when the element reaches a limit position. The connection between the connection Y2 or Y1 which is not in use and the power supply remains interrupted during non-use. A respective switch element having a control input is connected upstream of the connection Y1 for forward motion and the connection for reverse motion. The control input of the switch element is connected to a respective control circuit which includes the respective limit switch. The advantages of the invention are that electromagnetic actuating members with a synchronous motor of that kind can be connected in parallel by way of limit switches without malfunctions occurring when the limit switches respond. The amount of wear of the synchronous motors is reduced and the service life thereof is thereby increased. The level of power consumption is reduced and the amount of noise developed is decreased.

5 Claims, 2 Drawing Sheets

METHOD AND APPARATUS FOR ACTUATING SYNCHRONOUS MOTORS

BACKGROUND OF THE INVENTION

1. Field of the Invention

The invention concerns a method and an apparatus for actuating a plurality of synchronous motors, connected to a common power supply, of the type which are operable for moving respective elements between two limit positions, and which have a connection for forward motion, a connection for reverse motion and a neutral connection.

2. Description of the Prior Art

Electromagnetic actuating members with a synchronous motor, as are used for example for opening and closing valves or other control elements, frequently use a synchronous motor, with a connection for forward motion, a connection for reverse motion and a neutral (common) connection. For forward motion of the synchronous motor, the connection for forward motion and the neutral connection are connected to the control device or the power supply installed therein, but for the reverse motion it is the connection for reverse motion and the neutral connection that are so connected. If only one such actuating member or only one such synchronous motor is connected for each output of the control device, then limit switches can readily be used between the outputs of the control device and the connections for forward and reverse motion respectively, and those limit switches switch off the power supply for the synchronous motor when the respective limit positions of the actuating member are reached (for example, the open or closed position of the valve).

If now a plurality of such actuating members or synchronous motors are connected in parallel to an output of the control device, malfunctions occur if not all limit switches switch off the power supply to the synchronous motor at precisely the same moment. Because the symmetry of the circuit and thereby the phase shift in the windings of all synchronous motors is disturbed by premature disconnection of only one of the limit switches involved, all parallel-connected synchronous motors go into an oscillating state and accordingly stop. The other parallel-connected actuating members therefore do not reach their limit positions. For that reason limit switches are not used with the existing solutions for parallel-connected actuating members of the above-indicated kind.

Nonetheless it is desirable to be able to provide for parallel connection of actuating members or synchronous-motors because then the number of outputs required on the control devices can be reduced and the costs incurred are lower. A current solution involves providing magnetic clutches in gearboxes instead of limit switches, with all parallel-connected synchronous motors being simply kept in operation as long as the respective signal from the control device is "on". It is also known for the signal from the control device to be switched off with a delay only when it can be assumed that all actuating members have reached their limit position. However, those systems suffer from the disadvantage that the synchronous motors still run when the limit position has already been reached. The use of magnetic clutches considerably increases the level of wear in the synchronous motors and in the transmissions, which reduces the service life of them. In addition, the power consumption is also increased somewhat and the noise produced by the synchronous motors and the magnetic clutch has a disturbing effect.

SUMMARY OF THE INVENTION

An object of the present invention is to provide an improved method and apparatus for actuating a plurality of synchronous motors connected to a common power supply, which no longer suffer from the above-mentioned disadvantages.

One aspect of the present invention is to provide a method of actuating a plurality of synchronous motors which are connected to a common power supply and are operable for moving respective elements between two limit positions, and which have a connection for forward motion, a connection for reverse motion and a neutral connection, the method comprising: for a respective motor, interrupting the connection between the one of the forward and reverse motion connections which is in use and the power supply by means of a limit switch which responds when the respective element reaches a limit position, the connection between the other of the forward and reverse motion connections, which is not in use, and the power supply being interrupted during non-use at least when the first-mentioned connection is interrupted.

Embodiments of the invention use respective switch elements which have a control input, and control circuits which include a limit switch, which are connected upstream of the connections of the synchronous motor for forward and reverse motion. That prevents a flow of current or compensating currents by way of the respective connections which are not being used, in a parallel circuit of a plurality of synchronous motors, in particular when the limit switches respond.

The advantages of embodiments of the invention are that electromagnetic actuating members with a synchronous motor, a connection for forward motion, a connection for reverse motion and a neutral connection can be connected in parallel by way of limit switches and operated without malfunctions occurring when the limit switches respond. The level of wear at the synchronous motors and the transmissions is reduced and thereby their service life is increased. The level of power consumption is reduced and the development of noise is also decreased.

BRIEF DESCRIPTION OF THE DRAWINGS

The above and other objects, features and advantages of the invention will be apparent from the following detailed description of an illustrative embodiment which is to be read in connection with the accompanying drawings, in which.

DESCRIPTION OF THE PREFERRED EMBODIMENT

Figure 1:
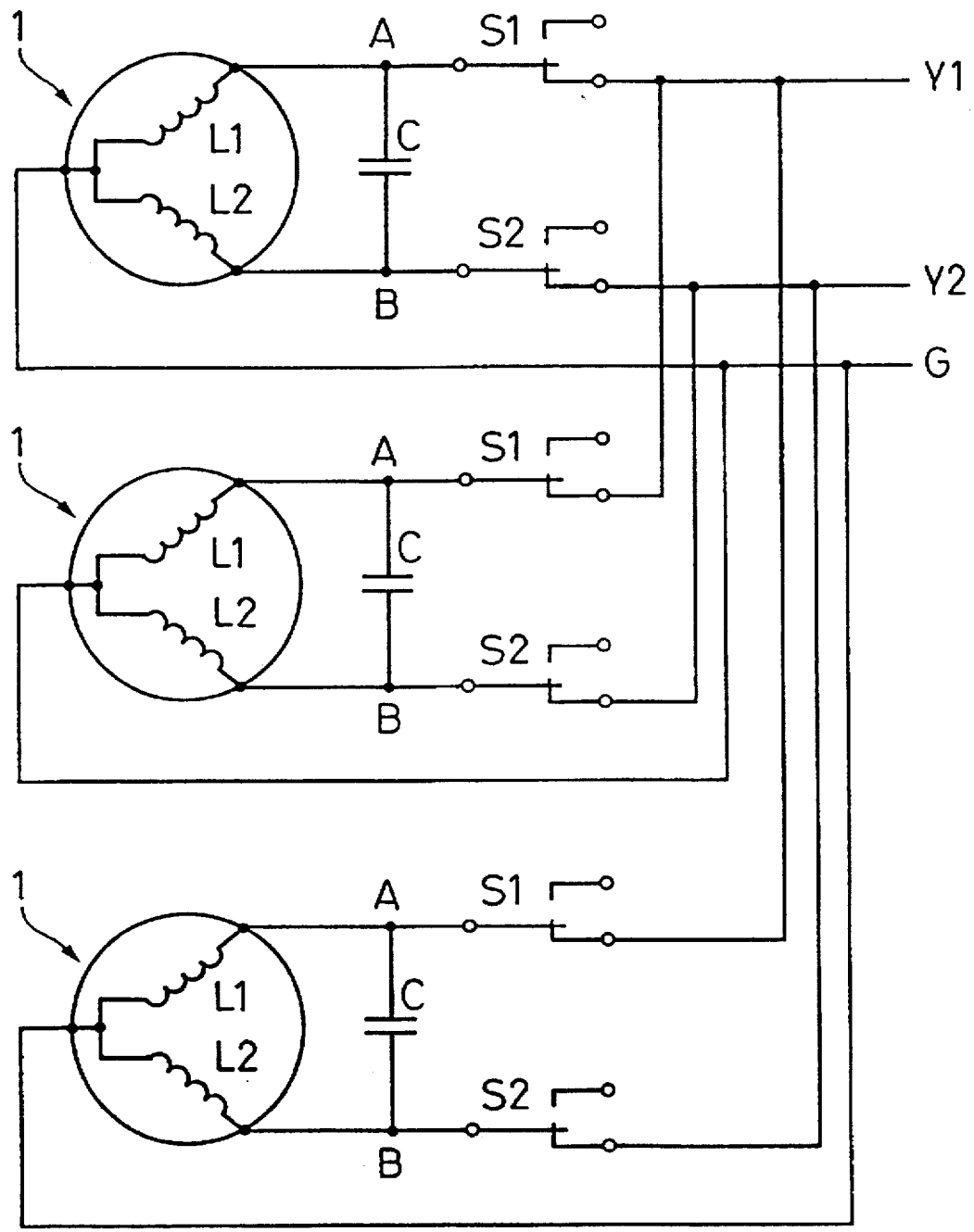
FIG. 1 is an electrical schematic diagram of parallel-connected synchronous motors with limit switches for illustrating the principle involved.

To show the circuitry principle involved, FIG. 1 shows three parallel-connected electromagnetic actuating members, each having a respective synchronous motor 1 with a connection Y1 for forward motion, a connection Y2 for reverse motion and a neutral connection G. The connection Y1 for forward motion is connected by way of a respective limit switch S1 to one end A of a first winding L1 of the synchronous motor 1. The connection Y2 for reverse motion is connected by way of a respective limit switch S2 to one end B of a second winding L2 of the synchronous motor 1. The other ends of the windings L1 and L2 are connected to the neutral connection G. A respective capacitor C is connected between the end A of the first winding L1 and the end B of the second winding L2. The limit switches S1 and S2 are positioned and connected to be operable in response to a control valve or other control device moving between its opposite desired extremes of movement, i.e., the desired limits of its movement, as for example, between fully open and fully closed valve positions.

In normal operation, which may be assumed here as being forward motion, for example an ac voltage of 24 V is applied to the connection Y1 for forward motion and the neutral connection G. All limit switches S1 are initially also closed in the forward motion mode. The ac voltage is applied directly to the first windings L1. The windings L2 are also connected to the ac voltage by way of the capacitors C. In that respect the inductances of the windings L2 and capacitors C are so selected that the phase displacement between current and voltage at the end B of the winding L2 reaches the value of 90° (in practice a tolerance of +/−30% is permissible). Because of the symmetrical potential configurations between L2 and C (the ends B of the windings L2 are all connected by way of the connection Y2 which is not in use), the circuit remains stable as long as none of the limit switches S1 opens.

However, when one of the controlled valves (or other control elements) reaches its first limit position, the respective limit switch S1 opens. It is assumed here that this is the case with the synchronous motor 1 which is shown at the top in FIG. 1. When the limit switch S1 opens, the above-mentioned symmetry conditions are disturbed. It is now only the two windings L1 of the other two synchronous motors 1 that are still connected between the connections Y1 and G. Only the two capacitors C of the other two synchronous motors 1 are still connected between the connections Y1 and Y2. Now, it is not only the three windings L2 of all three synchronous motors 1 that are connected between the connections Y2 and G, but also (in series) the winding L1 and the capacitor C of the uppermost synchronous motor 1. All synchronous motors 1 begin to vibrate and stop because the condition for the phase position of current and voltage at the ends B of the windings L2 is no longer met. For the reasons stated a simple parallel connection of actuating devices with synchronous motors is not possible by way of limit switches (as shown in FIG. 1).

Figure 2:
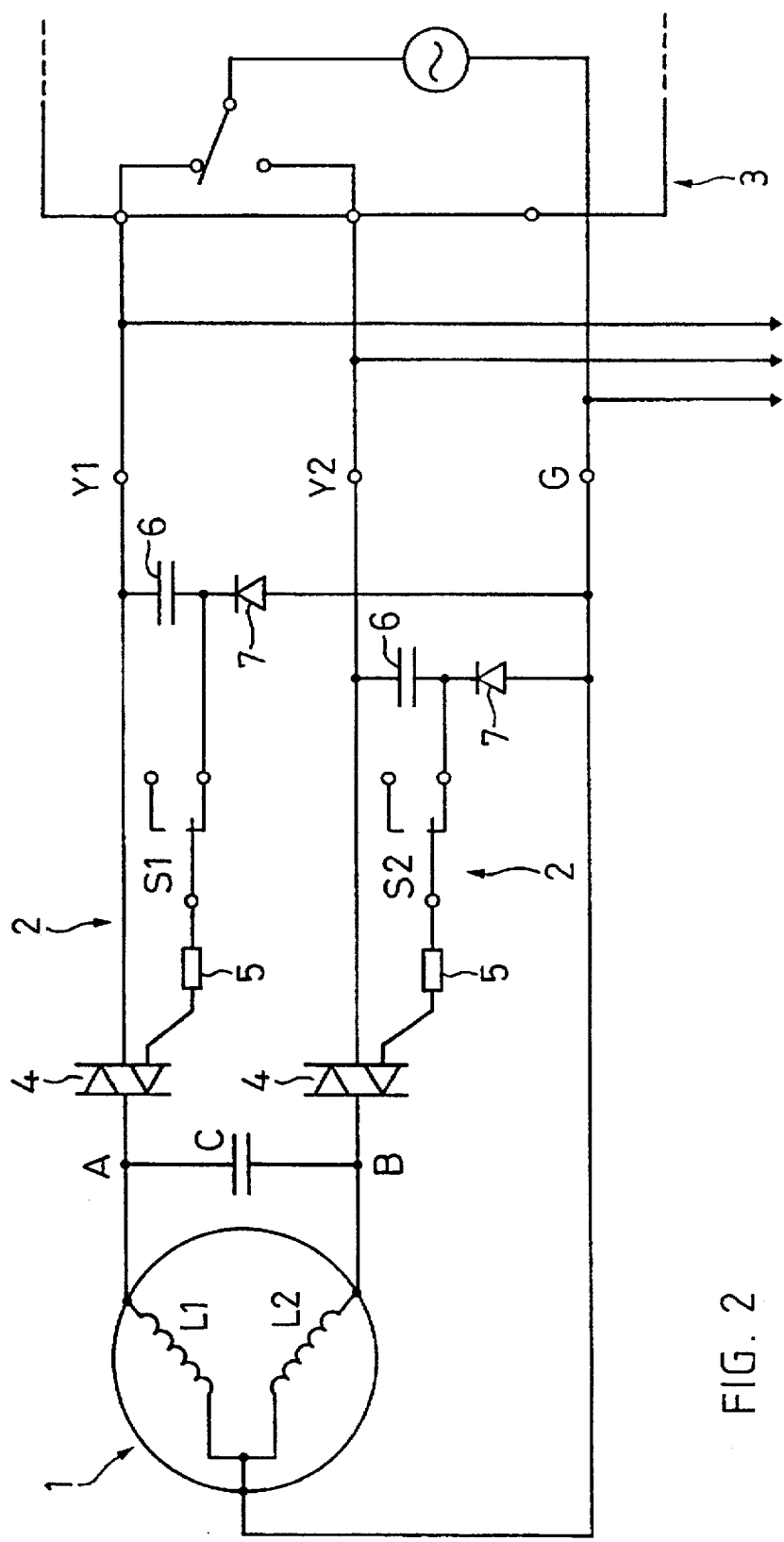
FIG. 2 is an electrical schematic diagram of apparatus embodying the invention for the parallel connection of a plurality of synchronous motors connected to a common power supply.

FIG. 2 shows an apparatus embodying the invention for the parallel connection of a plurality of synchronous motors connected to a common power supply. Each synchronous motor 1 has a connection Y1 for forward motion, a connection Y2 for reverse motion and a neutral connection G. A control device 3 applies the ac voltage of a power supply either to the connections Y1 and G if the synchronous motor is operated in the forward motion mode or to the connections Y2 and G if the synchronous motor 1 is operated in the reverse motion mode. Further synchronous motors of the same kind can be connected in parallel (as indicated by the arrows). A respective switch element with a control connection is connected upstream of the connection Y1 for forward motion and the connection Y2 for reverse motion, wherein the control connection is respectively connected to a control circuit 2 which includes a limit switch S1 or S2. Unlike the circuit shown in FIG. 1, however, the limit switches S1 and S2 are not arranged directly in the motor circuit. The switch element is a triode-ac switch (TRIAC) 4. It will be appreciated that other switch elements, for example relays, may also be used to produce the switching function.

The control circuit 2 is described hereinafter for the forward-motion connection Y1 which is used in the illustrated example (FIG. 2), but the description also applies in corresponding manner to the corresponding control circuit 2 of the connection Y2 which is not in use. The control connection of the triode-ac switch 4 is connected by way of a resistor 5 to the opening contact of the limit switch S1. In addition, the connection Y1 for forward motion is connected by way of a control capacitor 6 and a diode 7 to the neutral connection G in such a way that the blocking side of the diode 7 is connected to the control capacitor 6 and at the same time also to the opening contact of the limit switch S1.

The control circuit 2 operates as follows: the triode-ac switch 4 is controlled by the diode 7, the control capacitor 6 and the resistor 5. In that respect the triode-ac switch 4 is switched on only when the control capacitor 6 is charged. That is the case when the ac voltage of the power supply is applied across the connections Y1 and G. The control capacitor 6 and the diode 7 thus serve as a detection element. The control capacitor 6 is charged up to the peak value of the applied ac voltage by way of the diode 7. The voltage across the control capacitor 6 then produces a current through the resistor 5 which activates the triode-ac switch 4 by way of its gate connection. The resistor 5 serves to limit the current for activation of the triode-ac switch. Conventional triode-ac switches, for example a TRIAC in accordance with IEC 191-2 in the TO-92 casing require an actuating current of about 5 to 10 mA. If there is no ac voltage across the connections Y1 and G, the control capacitor 6 is discharged and the triode-ac switch is switched off again. When the limit switch S1 is opened, the synchronous motor 1 is also switched off. The illustrated control circuit 2 does not require a separate power supply and the power consumption of the control circuit for the respective connection which is not being used is also equal to zero.

Therefore, the illustrated circuit provides that the connection between the connection Y1 which is in use and the power supply is interrupted by means of a limit switch S1 which responds when the control element has reached its limit position. It additionally also provides that the connection between the connection Y2 which is not in use and the power supply or the connections Y2 which are not in use of the other parallel-connected synchronous motors is not only interrupted when the limit switch S1 responds, but as long as the connection Y2 is actually not in use.

Connections which are not in use are permanently and reliably switched off with the illustrated arrangement. If a plurality of synchronous motors are connected in parallel as shown in FIG. 2 and operated for example as illustrated in the forward motion mode (the ac voltage is then applied in all synchronous motors 1 across the connections Y1 and G), then all connections Y2 are switched off. That means that, even when one of the limit switches S1 opens, the circuit cannot go into an unstable state because the (disturbing) parallel connections are interrupted, by way of the connections Y2. The respective synchronous motor 1 which is switched off first no longer influences the symmetry of the other parallel-connected synchronous motors 1 for both windings L1 and L2 are reliably separated from the respective connections Y1 and Y2.

The foregoing description relating to the forward motion mode also applies in a similar manner to the reverse motion mode.

Although an illustrative embodiment of the invention has been described in detail herein with reference to the accompanying drawings, it is to be understood that the invention is not limited to this precise embodiment, and that various changes and modifications can be effected therein by one skilled in the art without departing from the scope and spirit of the invention as defined by the appended claims.

Various features of the invention are set forth in the appended claims.

What is claimed is:

1. Apparatus for actuating at least two synchronous electric motors which are connected to a common alternating current power supply, each said motor being operably connected for displacing an associated element between two limit positions, and being adapted to operate in a forward direction and in a reverse direction, said apparatus comprising:

first circuit means for connecting said power supply to each said motor for producing forward direction operation thereof;

second circuit means for connecting said power supply to each said motor for producing reverse direction operation thereof;

switching means for selectively and alternately connecting one of said first and second circuit means to the power supply;

a first limit switch means connected in said first circuit means of each said motor and adapted to interrupt said power supply to said associated motor in response to said first limit switch means being actuated by the element reaching one of said two limit positions; and, a second limit switch means connected in said second circuit means of each said motor and adapted to interrupt said power supply to said associated motor in response to said second limit switch means being actuated by the element reaching the other of said two limit positions;

wherein said power supply to one of said two motors is unaffected when one of said first and second limit switch means of another of said two motors interrupts said power supply to said another motor.

2. Apparatus according to claim 1 further including a detection element connected in said first circuit means and said second circuit means, each said detection element being adapted to produce an output control voltage precisely when a voltage occurs in said respective circuit means.

3. Apparatus according to claim 2 wherein each of said first circuit means and said second circuit means includes a disconnect switching means that has a control input for controlling the operation thereof, said detection element being connected to said control input of said disconnecting switching means via said associated limit switch means.

4. Apparatus according to claim 3 wherein each of said first and second circuit means has two connections, one of which is a neutral connection, said detection element includes a control capacitor which is connected in series with a diode, said detection element being connected between said two connections.

5. Apparatus according to claim 1 wherein said disconnect switching means are triode-ac switches.

* * * * *